Dec. 5, 1967     Y. R. GUTTMAN     3,356,087
EUTHANASIA APPARATUS
Filed Feb. 10, 1966     2 Sheets-Sheet 1
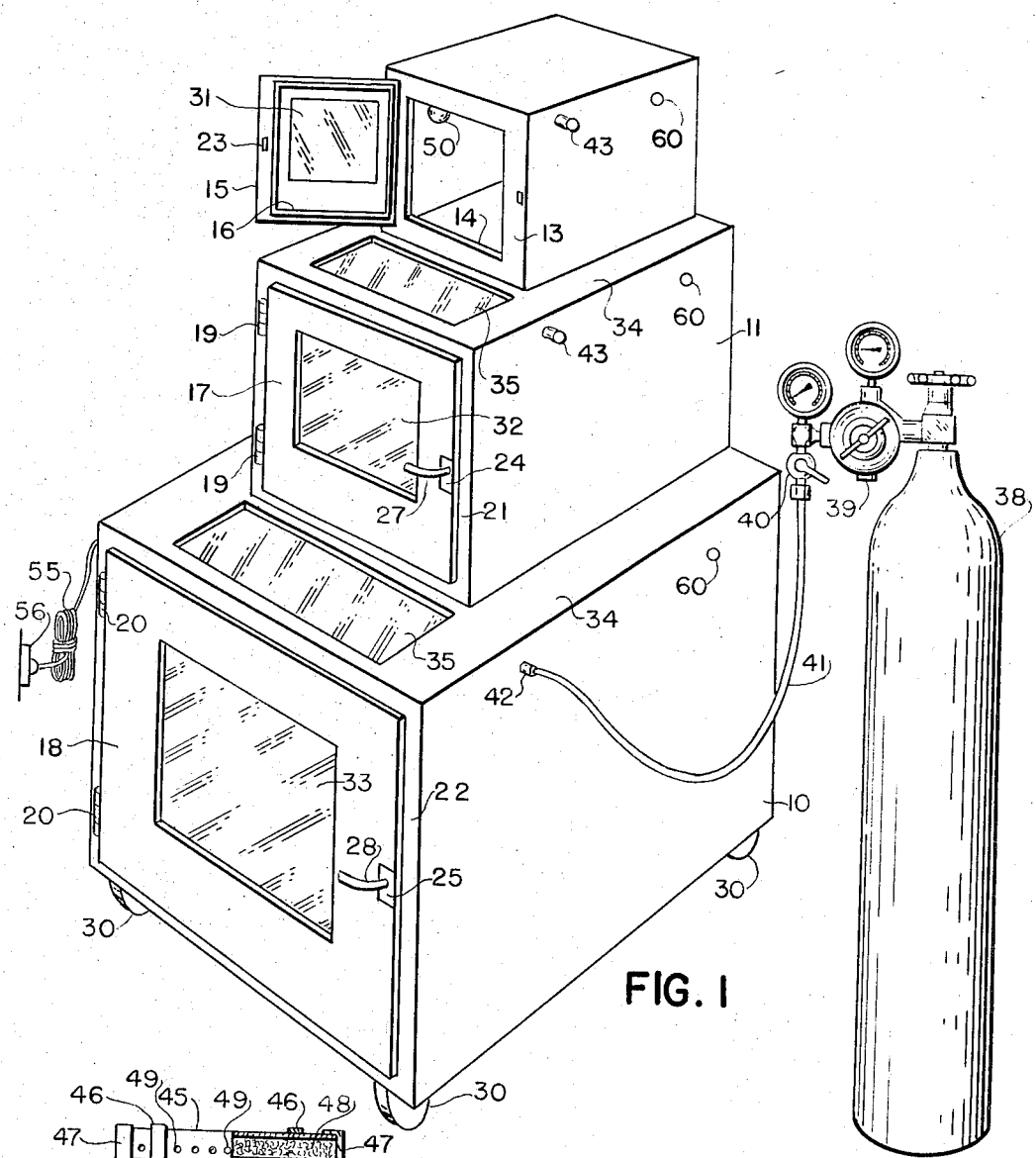
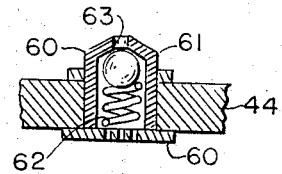
INVENTOR:
YOLAN R. GUTTMAN
BY
ATTORNEY Dec. 5, 1967     Y. R. GUTTMAN     3,356,087
EUTHANASIA APPARATUS
Filed Feb. 10, 1966                 2 Sheets-Sheet 2
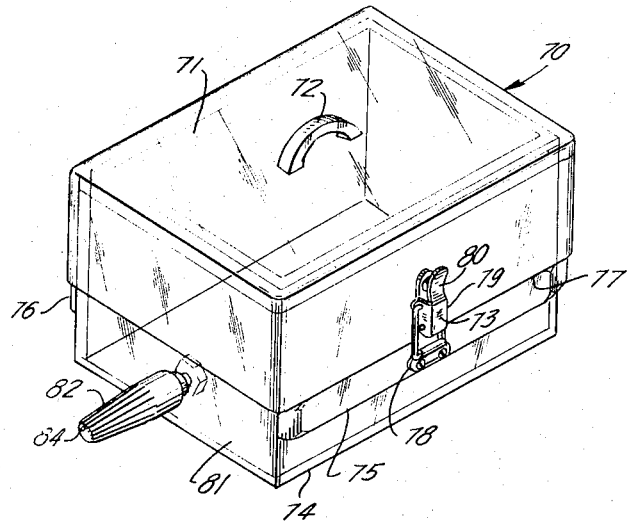
FIG. 5
FIG. 7
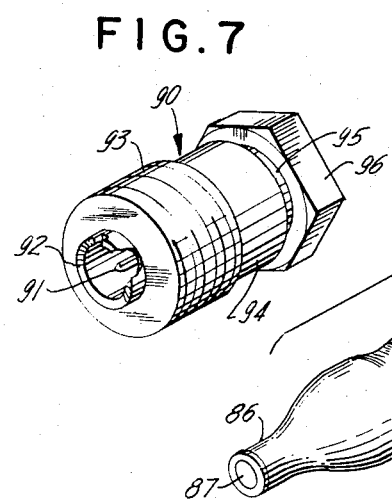
FIG. 6
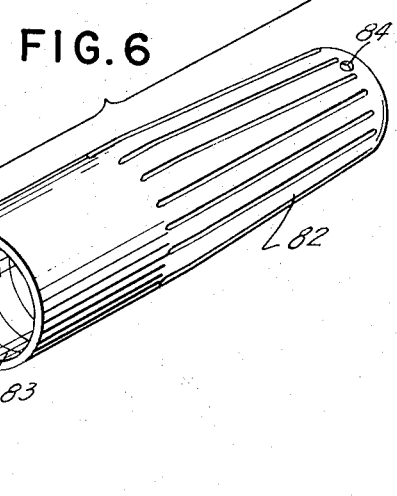
FIG. 8
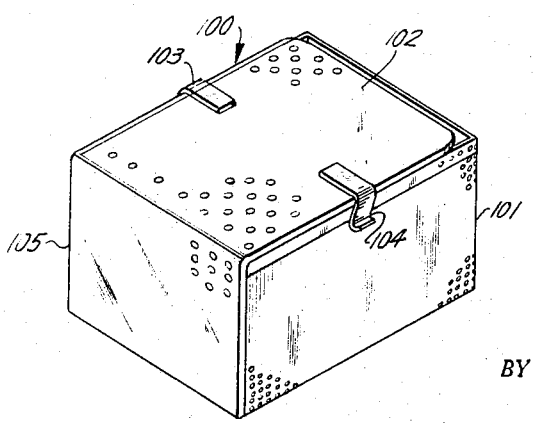
INVENTOR.
YOLAN R. GUTTMAN
BY
Buckman and Archer
HER ATTORNEYS

United States Patent Office 3,356,087
Patented Dec. 5, 1967

3,356,087
EUTHANASIA APPARATUS
Yolan R. Guttman, 1815 Davidson Ave.,
New York, N.Y. 10453
Filed Feb. 10, 1966, Ser. No. 526,556
6 Claims. (Cl. 128—172)

The present patent application is a continuation-in-part of application Ser. No. 283,328 which was filed May 27, 1963, and now abandoned. This invention relates to general to euthanasia for animals and, more particularly, to euthanasia apparatus using carbon dioxide gas.

There is a great need for a humane method of euthanasia for use by animal shelters, laboratories, and the like. In the past, the destruction of animals has been accomplished mechanically, electrically, and chemically. Nevertheless, there has not been a simple and effective means that could be carried out by semi-skilled employees and that would provide the desired condition of the animal after death. Electrocution is not suitable for mass euthanasia because each animal must be individually handled. Furthermore, electrocution is not suitable for vicious or intractable animals and the apparatus requires a well trained operator. Shooting with a conventional firearm or a captive bolt pistol is not satisfactory inasmuch as many factors operate to prevent the proper application of these techniques. Explosive decompression is not satisfactory inasmuch as it is apparently not suitable for use on young animals and lesions in sensitive organs indicate the probability of severe pain resulting from the procedure.

Noninhalant agents, although they may be administered in many ways, e.g. intravenous, intracardiac, intraperitoneal, intrathecal, intramuscular, subcutaneous, or oral, are not always satisfactory because a degree of operator skill is required.

The administration of lethal doses of drugs requires professional training and the parenteral administration of these drugs requires the particular skills of professional personnel of a caliber not usually employed for the killing of animals. Also, the injection and oral administration of such drugs requires very close individual handling of the animals. In the case of intractable animals, this is difficult. In the case of animals suffering from communicable diseases, this is dangerous.

The use of lethal drugs is also contra-indicated in some forms of medical research. For example, in relation to cancer research, such drugs alter the chemical composition of tissue fluids and may frustrate the prime purposes of the research project. At the present time, in order to avoid use of such lethal drugs, many of the animals used are killed by means of cervical fractures, skull fractures, decapitation, and other physical means that result in damage to the anatomical structures involved.

Of the inhalant agents, ether and chloroform are not desirable. These agents are expensive and their vapors cause burning irritation to the mucous membranes and result in prolonged struggles before death. Other agents such as hydrogen cyanide and purified carbon monoxide are not desirable because they are dangerous to the operator, even when inhaled in small doses. In addition, it has been found that the use of carbon monoxide gas admitted into an enclosure directly from the exhaust pipe of an automobile, for instance, causes the atmosphere within the enclosure to become overheated. This increases the agony of the animal until death occurs.

It has been found that the best inhalant agent available for the painless killing of animals is carbon dioxide. When administered in appropriate concentrations, this gas causes the animals to become unconscious within seconds due to its narcotizing-anesthetizing effect. Death occurs within a few minutes while the animals are unconscious. Kittens, puppies, and small rodents die within fifteen seconds. Large dogs become unconscious within forty-fifty seconds, and cats within twenty-five–thirty-five seconds. These larger animals die within three–five minutes. The animals suffer no apparent pain and show no undue signs of anxiety. In comparison with the use of other means, it may be noted that the time involved in killing animals with chloroform is approximately one-half hour. The use of carbon monoxide gas from exhausts requires twenty-twenty-five minutes, with unconsciousness attained only immediately before death. Obviously, the carbon dioxide administration is not dangerous to an operator. Also, it is inexpensive and easily obtained commercially.

It is, therefore, an object of this invention to provide an apparatus which may be used for the euthanasia of animals by causing them to inhale carbon dioxide gas.

The recognition of carbon dioxide as an effective inhalant for euthanasia solves the initial problem of the basic method to be employed. However, to take advantage of this method, suitable apparatus is of extreme importance. Obviously carbon dioxide can be administered to animals by simply placing them in an enclosed chamber and filling the chamber with the gas. This is a highly unsatisfactory procedure because it does not provide adequate control conditions, it is inefficient, it may panic the animals, it may cause physical damage to the animals before death, and it may be dangerous.

Thus, a number of factors are important in the design of apparatus for animal euthanasia. The equipment must be adaptable to standard procedures which enable semi-skilled operators to kill animals in a painless manner without difficulty and without damage to the animals. In the case of animals destroyed in the couse of some research projects, or for their pelts, this physical damage may be intolerable. Furthermore, it is important that the operating personnel have visual contact with the animals in order to insure that the proper course of events is ensuing. Still further, it is important that the apparatus be as simple and convenient to use as possible so that semi-skilled personnel can be relied upon to efficiently handle the procedures.

It is also desirable to have apparatus that can be operated without the use of electricity or electrically run motors. Such apparatus is particularly useful in underprivilege areas, backward countries, or in relatively inaccessible locations. The elimination of the need for electricity also reduces maintenance cost of electrical equipment and operating costs of the apparatus itself. Still further, the possibility of elctrical failure and concomitant interruption of the euthanasia process, is eliminated.

In developing apparatus which satisfactorily attains the above general objectives, it is also important to minimize cost. Cost is always a function of the initial fabrication requirements, maintenance requirements, and the need for replacement parts. In this particular type of apparatus, it is also a function of the efficiency with which the gas is administered. The apparatus should be designed for optimum utilization of the gas and only the minimum amount of gas should be used to accomplish the desired results.

Another object of this invention is to provide improved apparatus for the euthanasia of animals wherein the animals are subjected to a minimum of fear and wherein they can be conveniently restrained from harming one another.

Another object of this invention is to provide improved apparatus for the use of medical research groups which will permit the expedient, simple, and speedy destruction of laboratory animals in a manner that will keep the animals in tact and free from the addition of lethal drugs that are foreign to their systems. Still another object of this invention is to provide improved apparatus that is entirely portable and requires no electrical power source, which can be used by animal shelters and pounds. Yet another object of this invention is to provide improved apparatus for the killing of animals of all sizes, species, and ages, without exception, whether killed singly or in groups or for any of the many purposes for which such animals may be used.

Another object of this invention is to provide an improved euthanasia apparatus wherein human operators may continuously visually monitor the procedure and may continuously control the administration of the gas.

Still another object of this invention is to provide improved euthanasia apparatus that is economical to produce and efficient to operate.

The present invention is primarily concerned with the basic elements needed for humane yet commercially worthwhile euthanasia equipment. Since it is necessary to dispose of animals that vary greatly in size, the invention is illustrated in several distinct embodiments. The first embodiment comprises separate chambers of varying size, each adapted for full viewing of the interior and each having independent inputs for the controlled administration of gas. The second embodiment is completely portable and may have a total interior volume approximating one-tenth of a cubic foot. This second embodiment, as more fully described hereinafter, is completely transparent and comprises a valved gas input structure operative in conjunction with commercially available gas cartridges to provide for controlled administration of the gas into the chamber.

The invention will be more fully understood and appreciated from the following detailed description which is made in conjunction with the drawings, wherein:

FIGURE 1 is a perspective view of one form of euthanasia apparatus according to the invention;

FIGURE 2 is a horizontal section taken through a side wall of one of the chambers of the apparatus in FIGURE 1, showing a gas inlet muffler partially in section;

FIGURE 3 is a horizontal section taken through a side wall of one of the chambers of the apparatus in FIGURE 1, showing a light unit;

FIGURE 4 is a longitudinal section taken through a fragment of a wall of one of the chambers in FIGURE 1, showing a pressure relief valve of a type which may be used in this apparatus;

FIGURE 5 is a perspective view of a portable embodiment of the invention;

FIGURE 6 is an exploded view showing a gas cartridge and control chamber adapted for use with the portable embodiment;

FIGURE 7 is an enlarged perspective view of the gas inlet valve adapted for mounting on one wall of the portable embodiment;

FIGURE 8 is a perspective view of a typical cage structure for use in conjunction with the apparatus of the invention.

Referring to the drawings in detail, FIGURE 1 shows three stacked rectangular chambers 10, 11, and 12 of diminishing size. The front wall 13 of chamber 12 contains the opening 14 over which the door 15 is hinged to close. Door 15 has the rubber gasket 16 fixed to it so that it makes an air-tight closure over the opening 14. The doors 17 and 18 are fixed, respectively, by the hinges 19 and 20 over openings in the front walls 21 and 22 of the chambers 11 and 10. The doors 15, 17, and 18 have the latch means 23, 24, and 25 which may be opened and closed by suitable handles 27 and 28 shown on the doors 17 and 18. The latch means are adapted for hooking the door as well as sealingly closing it. Gas is initially applied to the chamber, there is an increased pressure. This higher pressure diminishes after the administration has been initiated. Thus, after the initial application of the gas, the door is completely closed and sufficient gas is admitted for narcotizing and asphyxiating the animals.

The lowermost and largest chamber 10 may be mounted on the wheels 30 so that the entire unit may be easily moved from one location to another and the smallest chamber 12 is easily portable by itself. The chambers 10, 11, and 12 may be made from any suitable material such as plastic, wood, or galvanized iron. If the chambers are made from wood, the inner joints of the edges should be sealed from the inside or the wood should be lined with a thin tin or aluminum air-tight lining. If the chambers are made from plastic, galvanized iron, sheet aluminum, steel plate, or other metal, they should be so fabricated as to be substantially air-tight.

Referring further to FIGURE 1, each door 16, 17, 18 contains a glass view plate 31, 32, 33, respectively. The top wall 34 of chamber 10 contains, in its most forwardly disposed portion in front of the container 11, a glass view plate 35. In a like manner, the top wall 36 of container 11 has in its most forwardly disposed portion in front of container 12 a glass view plate 37. If it is desired, the view plates may be made from transparent plastics or other suitable material.

A commercially available cylinder of carbon dioxide gas 38 having a pressure reducing regulator 39 mounted on it, is illustrated adjacent to the stacked chambers. The pressure reducing regulator 39 is settable to deliver needed amounts of gas in accordance with the volume requirements of the chamber being used. The amount of gas is administered in accordance with precalculated concentrations that are essential for the speedy and painless dispatching of the animals within the chamber. The particular concentrations for each animal or group of animals, may be supplied in tabulated form along with instructions for the use and operation of the equipment. Attached to the pressure reducing regulator 39 is a line valve 40 connected to a length of rubber hose or other suitable tubing 41. The end of hose 41 terminates in a standard coupling nut or any equivalent fitting 42 which may be attached to any one of the bushings 43 which extend through a side wall of each of the chambers 10, 11, and 12.

As shown in FIGURE 2, the bushing 43 extends through a side wall 44 of a chamber and enters a muffler 45 which is fixed to side wall 44 by means of the brackets 46. Muffler 45 serves to mitigate the noise caused by the pressurized gas so as not to unduly alarm the animals confined in the chamber.

As shown in FIGURES 1 and 3, each chamber should contain a light bulb 50 screwed into a suitably mounted fixture 51. A lead wire 52 extends from fixture 51 through a side wall 53 of each chamber to terminate in an electrical connection such as a male plug element 54. This allows a standard extension cord 55 to be attached to the male outlet 54 and a wall receptacle 56 so that a bulb 50 may be lighted for purposes of observation in any of the chambers which is being used. If it is desired, bulb 50 may be protected by a suitable cage or basket structure (not shown).

The embodiment shown in FIGURES 1-4 may be used in the following manner. Depending upon the size or the number of animals to be destroyed, a chamber or container 10, 11, or 12 is selected. If more than one animal is to be placed within a container, the animals may be stacked within the chamber in separate wire baskets or cages, such as shown in FIGURE 8, so they will not attack each other. When constructed to be stacked as shown in FIGURE 1, an operator has a clear view of the interior of each chamber through view plates. After placing the animals within a suitable chamber, the operator connects cord 55 to light the interior of the chamber selected. Hose 41 is then connected to the appropriate fitting 43 and valve 40 is opened. An operator may stand with his hand on valve 40, as the height of the average cylinder 38 is about five feet, and he may look within the chamber being used. As soon as he notes that the animal or animals which are being destroyed have fallen down and been rendered unconscious, the supply of gas may be cut off or continued for a few seconds. After five minutes, the door of the chamber used may be opened and the dead animals removed. In a large well ventilated room, the amount of gas released upon the opening of a door will not prove harmful to an operator. If desired, a suitable blower and ventilating system may be placed near the chambers.

The selection of the sizes of the chambers permits the apparatus of this invention to be used by animal shelters, research laboratories, fur farms, and other situations where there is a large variety of animals used for purposes other than food, have to be destroyed. By selecting the chamber which most closely accommodates a given animal or group of animals, carbon dioxide gas is conserved and the desired concentration of the gas is more rapidly attained to more quickly render the animals unconscious. The use of carbon dioxide is both safe to an operator and painless to the animals. The stacking of the chambers renders them more easily accessible to an operator and enables him to more easily connect a desired chamber to an electric current source and to a cylinder of gas. Further, the stacking of the containers in the manner shown facilitates the observation of the animals therein.

A miniature portable euthanasia apparatus that is particularly useful for research laboratories constitutes a further illustrative embodiment of the invention; this apparatus is shown in FIGURE 5. The chamber 70 is made up of a lower portion 74 and a cover 71. The lower portion is basically a five-sided box made preferably of transparent plastic material. The cover 71 is also five-sided and may be made of transparent material. It is carefully dimensioned to fit snugly over the opening of the bottom portion 74. The cooperating parts are dimensioned so that when the upper edges of portion 74 abut the top surface of the cover 71, the edges 77 of cover 71 rest upon a ridge 75 or 76.

The cover is secured in place by at least two latches 73. These latches may be positioned in the center of each of the longer sides of the chamber. A particularly useful latch is the conventional type wherein the cover of the box carries a loop portion 79 and the bottom carries a hook portion 78. A release tab 80 is adapted to loosen the loop 79 enabling it to be placed over the hook portion 80. In the position shown, release tab 80 is locked and has secured the cover in place with a tight joint at 77. A handle 72 is provided by means of which the box may be safely carried when closed. This handle is also of assistance in raising the cover when the latches 73 are released.

It should be noted that in its preferred form, box 70 is completely transparent. This permits an operator to view the inside at all times and insures continual visual monitoring of the euthanasia procedure.

Gas is introduced into box 70, when properly secured, by means of a valve 90 which is mounted on one end 81 of the chamber. Details of this valve appear in FIGURE 7. The gas cartridge retaining and control member 82 is shown in position over the valve in FIGURE 5, and FIGURE 6 is an exploded view showing the gas cartridge 85 and the open end of retaining member 82. It will be seen that retaining member 82 is a substantially cylindrical element having a closed end portion. The closed end portion is penetrated by an aperture 84 which prevents build-up of gas within the member and which furthermore makes it possible to thread the member into engagement with the euthanasia chamber 70 without creating increased pressure within itself. The open end of member 82 has an internal thread 83 adapted to cooperate with the thread 93 illustrated on the valve in FIGURE 7. Member 82 is internally dimensioned to provide adequate seating for gas cartridge 85. The gas cartridge 85 is of a commercial variety and is easily and economically obtained. The rear end of this gas cartridge is nested in the retaining member 82 and at the forward portion a cap 86 with thin membrane 87 at the center, seals the cartridge and retains the gas.

Before describing a typical operating sequence, further attention should be given to the valve itself. As shown in FIGURE 7, the valve comprises a generally cylindrical portion 94 having external threads 93 on one end, and a hexagonal nut 96 on the other. A groove or depressed portion 95 adjacent the threaded nut, is adapted to fit within a corresponding hole on the end of the euthanasia chamber. The external shoulder on this groove then rests in an air-tight fashion against the outer portion of the chamber wall, and the hexagonal nut is tightened upon a thread until the entire valve assembly is securely and sealingly mounted. The valve itself includes a grooved pin 91 which is centered in the valve cylinder 94 and a nesting collar 92 which is adapted to cooperate with the shoulder of the gas cartridge 85 illustrated in FIGURE 6.

During operation, the cartridge retaining member 82 is threadedly engaged with the valve and gradually rotated clockwise in order to force membrane 87 of the gas cartridge into contact with the pin 91 of the valve assembly. By continuing advancement of retaining member 82, the cartridge is forced against pin 91 until perforation occurs. Under these conditions, the gas escapes from the cartridge into the interior of the chamber. Increased tightening of member 82 against the valve will result in a more rapid discharge into the chamber itself.

It should be understood that in order to obtain maximum efficiency, the interior volume of chamber 70 is designed to provide effective destruction of the desired animals by the amount of gas contained in the commercially available cartridge 85. In the particular embodiment shown, suitable dimensions have been found to be 8.5" x 6" x 4.5" for the length, width, and height dimensions respectively. It is obviously of extreme importance to have the volume properly established for the particular gas cartridge used. Experiments have shown that with the illustrated embodiment, a dozen or more white mice used in medical research may be effectively killed at a cost of approximately one cent per mouse.

As mentioned above, it is often desirable to employ cages in order to properly contain or retain the animals being destroyed. A typical cage of the type contemplated for use with this invention, is illustrated in FIGURE 8. The cage 100 consists primarily of a perforated metal five-sided box 101. The perforations in this metal should be of sufficient size to afford a proper view of the contents, permit adequate gas circulation, and they should also be sufficiently small to avoid entangling of the animal's feet or other appendages. The external dimensions of the box may conveniently be made to fit within a portable chamber such as illustrated in FIGURE 5. In keeping with the requirement for maximum visibility, applicant finds a plastic cover 102 to be of maximum utility. This cover 102 has a depending edge 105 adapted to rest along one side of box 101. It is fitted with two clips 103, 104 adapted to bear against the external edges of box 101. These clips are resiliently formed to press against the walls of the box 101 and keep the plastic member in place. Perforations are provided in both upper portion 102 and edge 105. These need not be of the same profusion as those in the metal cage itself, but they must afford adequate gas circulation. The side 105 of cover 102 acts as a shield when the cage is placed in chamber 70. The perforations are needed to admit the gas without creating a detour that would prolong the euthanasia procedure. By interposing this shield, the animals are protected from the direct spray of the gas. If such gas is administered too rapidly, Dry Ice would form.

The invention has been described in conjunction with embodiments adapted to serve for the euthanasia of animals varying in size from that of a large dog to that of the smallest rodent. The design of these embodiments provides for maximum visibility of the entire contents. In addition, the second embodiment relates to a piece of portable apparatus that can be used by semi-skilled personnel with a minimum of expense and with complete safety. Other embodiments, compatible with the illustration and teaching of the present invention will immediately become apparent to those skilled in the art. Such further apparatus, as well as that specifically described hereinabove, is contemplated by the definition of the invention set forth in the appended claims.

What is claimed as new and desired to be secured by Letters Patent of the United States is:

1. Animal euthanasia apparatus for use in administering lethal concentrations of carbon dioxide gas, comprising a chamber consisting of separable upper and lower telescoping portions establishing a predetermined internal volume when closed, each of said portions having at least four walls and a base, the edges of the inner portion when said portions are telescoped together, being seated against the base of the other portion, and said portions being relatively dimensioned to effect a snug substantially airtight fit therebetween when telescoped together, a source of gas, and a valve providing a unidirectional input port in one of said portions, said source being connected to said port for admitting gas from said source to said chamber.

2. Animal euthanasia apparatus as defined in claim 1, including raised members on two walls of said inner portion positioned so that the edges of the other portion are seated thereon when said portions are telescoped together, and cooperating latching means mounted on the raised members and on the external sides of the adjacent edges of said other portion.

3. Animal euthanasia apparatus for use in administering lethal concentrations of carbon dioxide gas, comprising a chamber consisting of separable upper and lower telescoping portions establishing a predetermined internal volume when closed, said portions being relatively dimensioned to effect a snug substantially air-tight fit therebetween when telescoped together, a cartridge containing a predetermined volume of gas at fixed pressure which will establish said lethal concentration of carbon dioxide within the internal volume of said chamber, a unidirectional input port in one of said portions including a valve having a pin projecting from the center thereof, and said cartridge having a perforable membrane positioned adjacent to said pin, and a support member for attaching the valve to the cartridge with a cavity dimensioned to receive said cartridge and hold it in axial alignment with said valve pin, said support member being internally threaded on the end adjacent to said valve, and external threads on said valve adapted to coact with the threads on said support member to effect closure therebetween when said support member is rotated, said support member being longitudinally dimensioned relative to the length of the cartridge to effect piercing of the cartridge membrane by said valve pin when the threaded portions are substantially engaged.

4. Animal euthanasia apparatus as defined in claim 3, wherein the support member has a perforation in the posterior portion thereof to prevent pressure buildup therein.

5. Animal euthanasia apparatus for use in administering lethal concentrations of carbon dioxide gas, comprising a transparent chamber consisting of separable upper and lower telescoping portions establishing a predetermined internal volume when closed, said portions each having four walls and a base and being relatively dimensioned to effect a substantially airtight fit therebetween when telescoped together, a valve providing a unidirectional gas input port in one of said walls, a gas cartridge containing a quantity of carbon dioxide under pressure that will establish said lethal concentration when released within said predetermined internal volume, means for securing said gas cartridge to said gas input port and effecting discharge of said cartridge into said chamber, cage means inserted in said chamber having at least four walls, said cage walls being transparent and gas permeable.

6. Animal euthanasia apparatus according to claim 5, in combination with cover means for said cage, said cover means being transparent and gas permeable and having a depending portion for interposition between the gas input port and the interior of the cage, configured to impede the direct flow of gas from the input port to the interior of the cage.

References Cited

UNITED STATES PATENTS

| | | | |
|---|---|---|---|
| 1,849,194 | 3/1932 | McCurrie | 128—172 |
| 2,470,721 | 5/1949 | Pragel | 128—1 |
| 2,730,093 | 1/1956 | Neely | 239—309 X |
| 3,003,658 | 10/1961 | Lindsey | 220—42 |

RICHARD A. GAUDET, *Primary Examiner.*

W. E. KAMM, *Assistant Examiner.*